United States Patent [19]

Goser

[11] 3,747,077

[45] July 17, 1973

[54] SEMICONDUCTOR MEMORY

[75] Inventor: Karl Goser, Munich, Germany

[73] Assignee: Siemens Aktiengesellschaft, Berlin and Munich, Germany

[22] Filed: Feb. 2, 1972

[21] Appl. No.: 222,770

[30] Foreign Application Priority Data

Feb. 11, 1971 Germany.................. P 21 06 579.2

[52] U.S. Cl............. 340/173 R, 307/238, 307/279, 340/173 FF

[51] Int. Cl........................ G11c 11/40, H03r 3/286

[58] Field of Search................. 340/173 R, 173 FF; 307/238, 279

[56] References Cited

UNITED STATES PATENTS

| | | | |
|---|---|---|---|
| 3,643,235 | 2/1972 | Berger | 340/173 R |
| 3,662,356 | 5/1972 | Michon | 340/173 R |
| 3,668,656 | 6/1972 | Hoggar | 340/173 FF |
| 3,675,218 | 7/1972 | Schler | 340/173 FF |

*Primary Examiner*—Terrell W. Fears
*Attorney*—Carlton Hill, J. Arthur Gross et al.

[57] ABSTRACT

An integrated semiconductor memory with storage elements in a circuit employing a flip flop with field-effect selective transistors and with an arrangement based on the two or multiple coincidence principle, with corresponding control lines.

11 Claims, 4 Drawing Figures

SEMICONDUCTOR MEMORY

BACKGROUND OF THE INVENTION

It is known to organize semiconductor memories in such a way that an individual storage element is controlled only if it receives coincident signals via one or more control lines in which selective transistors are inserted. For this purpose, a circuit operating with a twofold coincidence is commonly used as exemplified in FIG. 1. As shown in FIG. 1, selective transistors for each of two control lines 3 and 4 are designated as 1 and 2.

The exemplified integrated semiconductor memory comprises a plurality of storage elements, one of such storage elements being shown in FIG. 1 as a flip flop with switch and load transistors. Controls in the memory are organized in columns and lines and are shown at 3 and 4. The connection of a storage element to a terminal 5 of the information line or digit line is only established when the selective transistor 1 as well as the selective transistor 2 are controlled by coincident signals in lines 3 and 4. Through this connection the writing or reading of a storage signal in or from this controlled storage element becomes possible. Power is supplied to the storage element at points 6 and 7 of the circuit.

An essential difficulty arises in the construction of an integrated semiconductor memory with storage elements as shown in FIG. 1. Very difficult technological steps have to be taken in order to carry out the necessary crossings of the control lines 3 and 4 which are arranged in lines and columns. Reference numeral 8 refers to such a point of crossing.

SUMMARY OF THE INVENTION

It is an object of the invention to provide a circuit and a construction for storage elements of an integrated semiconductor memory wherein the creation of the crossings of the control lines, which are organized in lines and columns, does not pose a technological problem and can be carried out practically during the production of the integrated memory.

According to the invention, the task of producing an integrated semiconductor memory, as described above, is solved in that only one selective transistor is provided for one branch of the flip flop in respect of two control lines whereby one of the control lines is connected with the gate and the other control line with the substrate.

It is a generally known method to provide selective transistors and control lines for both branches of the flip flop in order to achieve a better control. According to a further development of the present invention, selective transistors, which are controlled and constructed according to the invention, are provided for both branches of the flip flop of the individual storage elements, i.e., again for two control lines of the individual branches one transistor each. In the rare case of a multiple coincidence, two control lines of a flip flop branch of a storage element are combined in a selective transistor, according to the invention. If the number of the coincidence is uneven, the remaining control line will be switched in the usual way. The crossings of the control lines of different selective transistors of a branch of a storage element, according to the invention, are carried out in the generally known two-layer wiring method.

DESCRIPTION OF A PREFERRED EMBODIMENT

Figure 2:
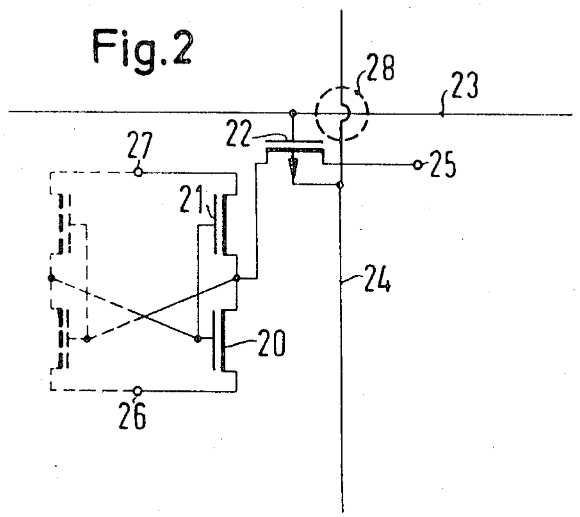
FIG. 2 is a diagramatic illustration of a preferred embodiment of the present invention.

Referring now to FIG. 2, shown therein is a storage element with control transistors 20 and load transistors 21, as well as a selective transistor 22, according to the invention. In FIG. 2, the second branch of the storage element, which is similar to the first branch, is shown by dotted lines.

Figure 1:
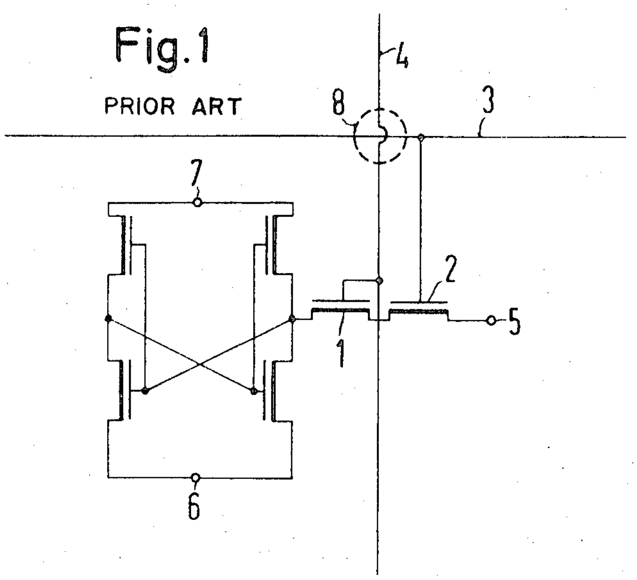
FIG. 1 is a diagramatic illustration of a prior art type of circuit.

In the circuit of FIG. 2, the selective transistor 22 takes over the function of both selective transistors 1 and 2 of the prior known storage element shown in FIG. 1. The selective lines are shown as 23 and 24, and the terminal to the information line as 25. The selective line 23 is connected to the gate of transistor 22 and the selective line 24 is connected to the substrate of transistor 22. It should be noted, however, that the connections of lines 23 and 24 with the transistor can be exchanged. The terminals 26 and 27 serve the feeding of supply voltage for the storage element, whereby generally terminal 26 is formed by the common substrate of all storage elements of the integrated semiconductor memory. The crossing of the access lines 23 and 24 is indicated at 28.

Figure 3:
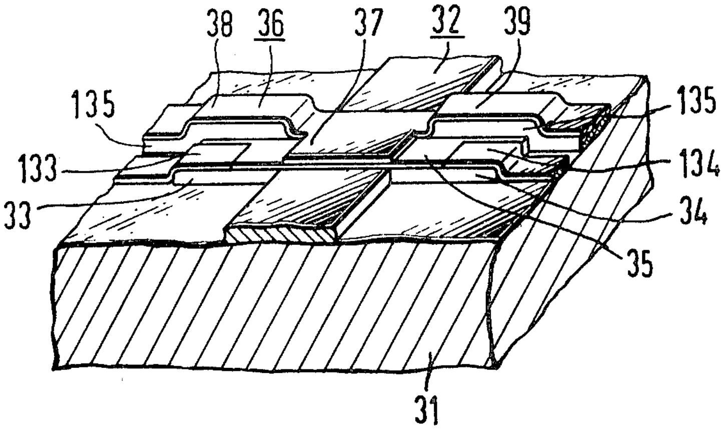
FIG. 3 illustrates a preferred form of selective transistor for use in the memory of FIG. 2.

Referring now to FIG. 3 where a preferred construction of a selective transistor is shown according to the invention, an electrically insulated carrier member 31 is shown. This carrier 31 supports a semiconductor substrate 32 of the selective transistor. The substrate is either p-type or n-type and contains oppositely doped areas 33 and 34, which form the drain and source area of the field-effect selective transistor. The electrodes on the drain and the source area are indicated as 133 and 134. The substrate has its surface covered with an insulating layer 35 at least to the extent that a surface is covered extending past the areas 33 and 34 and over the substrate between these areas. A further layer 36, which has high electrical conductivity, is formed on this insulating layer in the region between the drain and source areas 33 and 34 as the gate electrode 37.

As is known, in the case of field-effect transistors, the insulating layer between the substrate 32 and the part of layer 36, which is effective as the gate electrode 37, is made relatively thin for the gate. A thicker insulating layer 135, or so-called thick oxide, is provided for the parts 38 and 39 of the conductive coating 37 which extend past the gate.

According to a further development of the invention, the coating 36 is passed through the memory as control lines, either line by line or column by column. Thus, all selective transistors of the storage elements of one line or one branch of a memory are interconnected by the coating 36. The second control line of the selective transistors of the storage element either of a column or a line of the memory is electrically interconnected by the substrate 32. This substrate is created like a tape which is essential orthogonal for the tape-like coating 36 on the carrier in a column or a line passing through the memory. The information line which passes through the entire memory is carried out in a generally known way, e.g., in or on the carrier 31, and is then connected to the electrode 134 of the source area.

The illustrated embodiment, according to FIG. 3, is constructed in the principally known thin-layer technique whereby the substrate of an individual transistor is electrically insulated in respect of certain other transistors. This is achieved by producing individual islands in the substrate, which are insulated from each other, on a preferably nonconductive carrier. The individual transistors, or as is the case in the present invention, a number of transistors, are then built into these islands. In case of an electrically conductive carrier, the substrate islands are separated preferably from each other electrically by a grown insulating layer which is located between the carrier and the substrate.

The invention may also be carried out in the so-called massive technique. In this technique, which is especially known from the complementary channel technique for storage elements, the substrate 32 is located in a so-called tub within the massive carrier member. This tub insulates the substrate with respect to the massive member through the effect of the pn junction occurring between tub and massive member, and which has to be reversed biased.

Figure 4:
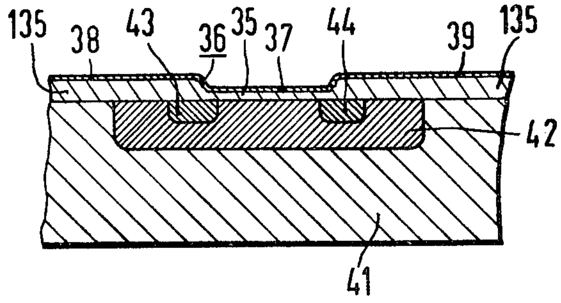
FIG. 4 is a vertical sectional view of a portion of the selective transistor shown in FIG. 3.

FIG. 4 shows in cross section a front view of a selective transistor, according to the present invention. The tub 42, which is doped opposite to the carrier material, is located in the massive carrier 41. 43 and 44 are the drain and source areas of the selective transistor, which are doped opposite to the tub. The other details of this embodiment, according to FIG. 4, correspond to the embodiment according to FIG. 3.

This invention applies the substrate control effect, which is known under different circumstances and among others is already described by Crawford in *MOSFET Circuit Design*, McGraw-Hill, New York 1967, page 40. In case of a field-effect transistor, this refers to the additional control of the electrical conductiveness of the channel by application of an additional potential to the substrate. In this case the substrate, insulated from the conductive channel by a depletion zone, acts as a second gate electrode. Depending on the chosen potential at the substrate, a shifting of the time of voltage application at the gate of the transistor takes place. By means of the new application of the substrate effect, a new advantageous construction of an integrated semiconductor layer with selective transistors designed according to the invention and as described above, becomes possible. According to the invention, only one transistor is required for two control lines and an important progress is achieved by the special arrangement for the crossings.

I claim as my invention:

1. An integrated semiconductor memory with storage elements in a flip flop formed with field-effect selective transistors and arranged to operate on a two or more coincidence principle with corresponding control lines, comprising a single selective transistor for one branch of the flip-flop of each storage element for two control lines, one of the control lines being connected with the gate and the other control line with the substrate of a storage element.

2. An integrated semiconductor memory according to claim 1 in which both branches of the flip flop of said storage element are provided with selective transistors.

3. An integrated semiconductor memory according to claim 1 in which the two control lines of a selective transistor cross in two stacked planes which are electrically insulated from each other, one of the control lines in the substrate of the selective transistor being positioned to pass through the transistor and the other control line being positioned to run via the gate electrode.

4. An integrated semiconductor memory according to claim 3 in which the selective transistors belonging to a column are constructed in a common substrate which is electrically insulated from the substrates of the selective transistors of the other column and the other column elements of the semiconductor memory.

5. An integrated semiconductor memory according to claim 3 in which the selective transistors belonging to one line are constructed in a common substrate, which is electrically insulated from the substrates of the selective transistors of the other line and the other line elements of the semiconductor memory.

6. An integrated semiconductor according to claim 1 in which the selective transistors are formed as thin film transistors.

7. An integrated semiconductor memory according to claim 1 in which the selective transistors of the semiconductor member are located in electrically insulated recesses.

8. An integrated semiconductor memory with flip flop storage elements having a field-effect transistor with substrate control between said flip flop and the control lines to said storage element.

9. An integrated semiconductor memory according to claim 8 in which only a single field-effect transistor provides the connection between the control circuit and the storage element.

10. In an integrated semiconductor memory, a storage element comprising a flip flop having two branches, each of which includes a pair of series connected field-effect transistors across a voltage source the gate of said transistors of each being connected together, the midpoints between the transistors of each pair being connected to the gates of both transistors of the other branch, said memory including a pair of access lines, a metal oxide semiconductor field-effect selection transistor, the channel of said selection transistor being connected between an information line and one of said midpoints, and one of said access lines being connected to the gate of said selection transistor and the other of said access lines being connected to the substrate of said selection transistor.

11. A device according to claim 10 in which said flip flop, said selection transistor and said access lines are formed as an integrated circuit.

* * * * *